(12) United States Patent
Lee et al.

(10) Patent No.: US 9,398,040 B2
(45) Date of Patent: Jul. 19, 2016

(54) INTRUSION DETECTION SYSTEM FALSE POSITIVE DETECTION APPARATUS AND METHOD

(71) Applicant: ELECTRONICS AND TELECOMMUNICATIONS RESEARCH INSTITUTE, Daejeon (KR)

(72) Inventors: Taek kyu Lee, Daejeon (KR); Geun Yong Kim, Daejeon (KR); Seok won Lee, Daejeon (KR); Myeong Ryeol Choi, Daejeon (KR); Hyung Geun Oh, Daejeon (KR); KiWook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 86 days.

(21) Appl. No.: 14/470,119

(22) Filed: Aug. 27, 2014

(65) Prior Publication Data

US 2015/0150132 A1  May 28, 2015

(30) Foreign Application Priority Data

Nov. 26, 2013  (KR) .................... 10-2013-0144682

(51) Int. Cl.
*H04L 29/06* (2006.01)

(52) U.S. Cl.
CPC ........ *H04L 63/1425* (2013.01); *H04L 63/0236* (2013.01); *H04L 63/1408* (2013.01); *H04L 63/1441* (2013.01)

(58) Field of Classification Search
CPC . H04L 63/14; H04L 63/1408; H04L 63/1416; H04L 63/1425; H04L 63/1441; H04L 63/1466
See application file for complete search history.

(56) References Cited

U.S. PATENT DOCUMENTS

| | | | |
|---|---|---|---|
| 8,418,249 B1 * | 4/2013 | Nucci | G06F 21/552 706/20 |
| 2006/0085855 A1 * | 4/2006 | Shin | H04L 63/1416 726/23 |
| 2007/0226802 A1 * | 9/2007 | Gopalan | G06F 21/564 726/24 |
| 2011/0093785 A1 | 4/2011 | Lee et al. | |

(Continued)

FOREIGN PATENT DOCUMENTS

KR  10-2006-0005719 A  8/2006
KR  10-0965452 B1  6/2010

(Continued)

*Primary Examiner* — Edward Zee
(74) *Attorney, Agent, or Firm* — LRK Patent Law Firm

(57) ABSTRACT

Disclosed herein is an Intrusion Detection System (IDS) false positive detection apparatus and method. An IDS false positive detection apparatus includes a payload extraction unit for extracting payloads by dividing each packet corresponding to an IDS detection rule into a header and a payload. A false positive payload information generation unit generates false positive payload information required to identify a false positive payload by extracting a payload of a false positive packet based on results of packet analysis received from a manager. A false positive payload determination unit transmits results of a determination of whether each payload extracted by the payload extraction unit corresponds to a false positive payload, based on the false positive payload information, to the manager.

16 Claims, 5 Drawing Sheets

(56) References Cited

U.S. PATENT DOCUMENTS

2011/0126286 A1* 5/2011 Nazarov ............... G06F 21/564
                                                          726/24
2012/0124661 A1   5/2012 Lee et al.

FOREIGN PATENT DOCUMENTS

| KR | 10-1005927 B1 | 1/2011 |
| KR | 10-2012-0043466 A | 5/2012 |

\* cited by examiner

INTRUSION DETECTION SYSTEM FALSE POSITIVE DETECTION APPARATUS AND METHOD

CROSS REFERENCE TO RELATED APPLICATION

This application claims the benefit of Korean Patent Application No. 10-2013-0144682, filed Nov. 26, 2013, which is hereby incorporated by reference in its entirety into this application.

BACKGROUND OF THE INVENTION

1. Technical Field

The present invention relates generally to an Intrusion Detection System (IDS) false positive detection apparatus and method. More particularly, the present invention relates to an IDS false positive detection apparatus and method, which are intended to improve the true positive efficiency of an IDS used to detect and cope with intrusion behavior when an intrusion behavior threatening the security of an information protection system occurs upon performing cyber security control and information protection tasks, and which detect known intrusion behavior based on intrusion behavior data (rule-based or knowledge-based data) using a misuse detection technique.

2. Description of the Related Art

Generally, security control and information protection tasks are configured to perform procedures for identifying true positive events causing cyber threat actions via the analysis of the header and payload of network packet data among pieces of security event detection information detected by an IDS.

However, 99% or more of security events are false positive events rather than true positive events causing cyber threat actions. Actions, which are conducted by an information protection manager and a security control analyzer and which analyze packet data information within such security events and then detect true positive events from a large number of false positive events, consume a lot of time and effort, consequently delaying the time to cope with actual intrusion incidents.

In order to solve such a problem, a plurality of methods for reducing false positive events, by optimizing the detection rules of an IDS, have been presented, but it is difficult to apply typical detection rule optimization methods because operation environments differ from each other between respective IDSs.

Therefore, when intrusion behavior threatening the security of an information protection system occurs upon performing cyber security control and information protection tasks, there is required an IDS false positive detection apparatus and method which detect known intrusion behavior based on intrusion behavior data (rule-based data or knowledge-based data) using a misuse detection technique in order to improve the true positive efficiency of an IDS used to detect and cope with such intrusion behavior.

Thus, the present invention uses a method of collecting and learning IDS detection rules and data about the payloads of false positive events via a continuous true positive and false positive identification learning procedure, based on pure payload parts other than the header parts of packet data identified as false positive events, among pieces of network packet data within a large number of security events detected by the IDS.

By means of a procedure for learning the results of collection and analysis of payload data within false positive events, the present invention automatically compares packet data within subsequently detected security events with the learned results, and provides the determination of whether pieces of payload data are identical or similar to each other. Thus, true positive events that will be cyber threats to an information protection manager and a security control analyzer, or security events having strong possibility of being true positive events are selectively displayed, thereby shortening the time required to analyze security events for intrusion behavior conducted over a network and improving a true positive rate for security events.

Further, there is proposed a method for facilitating the identification of IDS detection rules in which a rate at which events are detected as false positive events is high and thus making it also possible to optimize IDS detection rules. As related technology, there is Korean Patent Application Publication No. 10-2006-0005719.

SUMMARY OF THE INVENTION

Accordingly, the present invention has been made keeping in mind the above problems occurring in the prior art, and an object of the present invention is to provide a method of collecting corresponding rules and data about false positive payloads via a continuous learning procedure based on pure payloads other than the header parts of packets which are definitely determined to be false positives among a large number of packets detected by an IDS, so that, when a subsequent packet is input, the results of determining whether payloads are identical or similar to each other by automatically matching the learned results with the packet are provided, thus displaying only true positive packets or packets having a possibility of being true positives to an analyzer, with the result that the analyzer can minimize the time allocated to the analysis of false positives.

Another object of the present invention is to efficiently generate IDS detection rules by reporting the tasks of changing or deleting IDS detection rules in which false positives have occurred to a manager so that the tasks can be performed.

In accordance with an aspect of the present invention to accomplish the above objects, there is provided an Intrusion Detection System (IDS) false positive detection apparatus, including a payload extraction unit for extracting payloads by dividing each packet corresponding to an IDS detection rule into a header and a payload; a false positive payload information generation unit for generating false positive payload information required to identify a false positive payload by extracting a payload of a false positive packet based on results of packet analysis received from a manager; and a false positive payload determination unit for transmitting results of a determination of whether each payload extracted by the payload extraction unit corresponds to a false positive payload, based on the false positive payload information, to the manager.

The payload extraction unit may divide each packet into a header and a payload and groups payloads having an identical data value among divided payloads, thus inducing results of determination, performed by the false positive payload determination unit as to whether each grouped payload corresponds to a false positive payload, to be transmitted to the manager.

The false positive payload determination unit may be configured to compare the false positive payload information with the payload extracted by the payload extraction unit, if the false positive payload information matches the extracted payload, determine that the extracted payload is a false positive payload, and if the false positive payload information does not match the extracted payload, determine that the extracted payload is a suspected true positive payload, thus classifying extracted payloads.

The false positive payload determination unit may include a transmission unit for transmitting the detection rule, the header of the packet, and the false positive payload and the suspected true positive payload classified by the payload classification unit to the manager.

The false positive payload information generation unit may include a reception unit for, if a packet corresponding to the suspected true positive payload corresponds to a false positive packet including a false positive payload, based on results of analysis performed by the manager as to whether the packet includes a false positive payload, receiving the false positive packet from the manger.

The false positive payload information generation unit may further include a false positive payload extraction unit for extracting a false positive payload included in the false positive packet received by the reception unit.

The false positive payload information generation unit may further include a generation unit for converting all or part of the false positive payload extracted by the false positive payload extraction unit into a Message Digest Algorithm 5 (MD5) value, and then generating false positive payload information.

The false positive payload information generation unit may further include an information grouping unit for grouping and classifying the false positive payload information, generated by the generation unit, by detection rules corresponding to the false positive payload information.

The false positive payload information generation unit may further include a detection rule optimization requesting unit for identifying a detection rule in which false positives of or exceeding a preset rate have occurred, based on the false positive payload information grouped by the information grouping unit, thus providing an optimization request alarm for the identified detection rule to the manager.

The IDS false positive detection apparatus may further include a true positive packet processing unit for, if a packet corresponding to the suspected true positive payload corresponds to a true positive packet having no false positive payload, based on results of analysis performed by the manager as to whether the packet includes a false positive payload, extracting and storing a time at which the true positive packet is detected, and a detection rule, Internet Protocol (IP) information, port information, and payload information corresponding to the true positive packet.

In accordance with another aspect of the present invention to accomplish the above objects, there is provided an Intrusion Detection System (IDS) false positive detection method, including extracting, by a payload extraction unit, payloads by dividing each packet corresponding to an IDS detection rule into a header and a payload; generating, by a false positive payload information generation unit, false positive payload information required to identify a false positive payload by extracting a payload of a false positive packet based on results of packet analysis received from a manager; and transmitting, by a false positive payload determination unit, results of determination of whether each of the extracted payloads corresponds to a false positive payload, based on the false positive payload information, to the manager.

Extracting the payloads may include dividing each packet into a header and a payload, and grouping payloads having an identical data value among divided payloads, thus inducing results of determination of whether each grouped payload corresponds to a false positive payload to be transmitted to the manager.

Transmitting the results of determination to the manager may include comparing the false positive payload information with the payload extracted by the payload extraction unit; if the false positive payload information matches the extracted payload, determining that the extracted payload is a false positive payload; and if the false positive payload information does not match the extracted payload, determining that the extracted payload is a suspected true positive payload, thus classifying extracted payloads.

Transmitting the results of the determination to the manager may further include, after classifying the extracted payload, transmitting the detection rule, the header of the packet, and the classified false positive payload and suspected true positive payload to the manager.

Generating the false positive payload information may include, if a packet corresponding to the suspected true positive payload corresponds to a false positive packet including a false positive payload, based on results of analysis performed by the manager as to whether the packet includes a false positive payload, receiving the false positive packet from the manger.

Generating the false positive payload information may further include, after receiving the false positive packet from the manager, extracting a false positive payload included in the received false positive packet.

Generating the false positive payload information may further include, after extracting the false positive payload, converting all or part of the extracted false positive payload into a Message Digest Algorithm 5 (MD5) value, and then generating false positive payload information.

Generating the false positive payload information may further include grouping and classifying the generated false positive payload information by detection rules corresponding to the false positive payload information.

Generating the false positive payload information may further include, after grouping and classifying the false positive payload information, identifying a detection rule in which false positives of or exceeding a preset rate have occurred, based on the grouped false positive payload information, thus providing an optimization request alarm for the identified detection rule to the manager.

The IDS false positive detection method may further include, after transmitting the results of the determination, if a packet corresponding to the suspected true positive payload corresponds to a true positive packet having no false positive payload, based on results of analysis performed by the manager as to whether the packet includes a false positive payload, extracting and storing, by a true positive packet processing unit, a time at which the true positive packet is detected, and a detection rule, Internet Protocol (IP) information, port information, and payload information corresponding to the true positive packet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
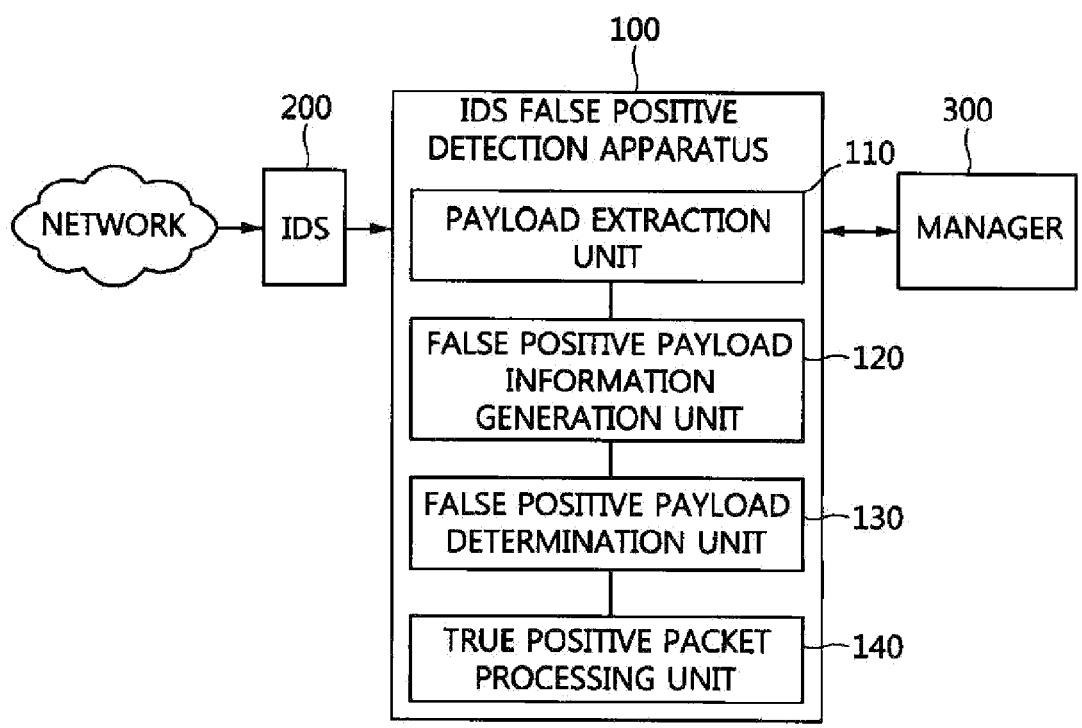
FIG. 1 is a block diagram showing an IDS false positive detection apparatus according to the present invention.

The present invention will be described in detail below with reference to the accompanying drawings. Repeated descriptions and descriptions of known functions and configurations which have been deemed to make the gist of the present invention unnecessarily obscure will be omitted below.

The embodiments of the present invention are intended to fully describe the present invention to a person having ordinary knowledge in the art to which the present invention pertains. Accordingly, the shapes, sizes, etc. of components in the drawings may be exaggerated to make the description clearer.

Further, in the description of the components of the present invention, the terms such as first, second, A, B, (a), and (b) may be used. Such terms are merely intended to distinguish a specific component from other components and are not intended to limit the essential features, order, or, sequential position of the corresponding component.

Hereinafter, an Intrusion Detection System (IDS) false positive detection apparatus according to the present invention will be described in detail with reference to the attached drawings.

Figure 2:
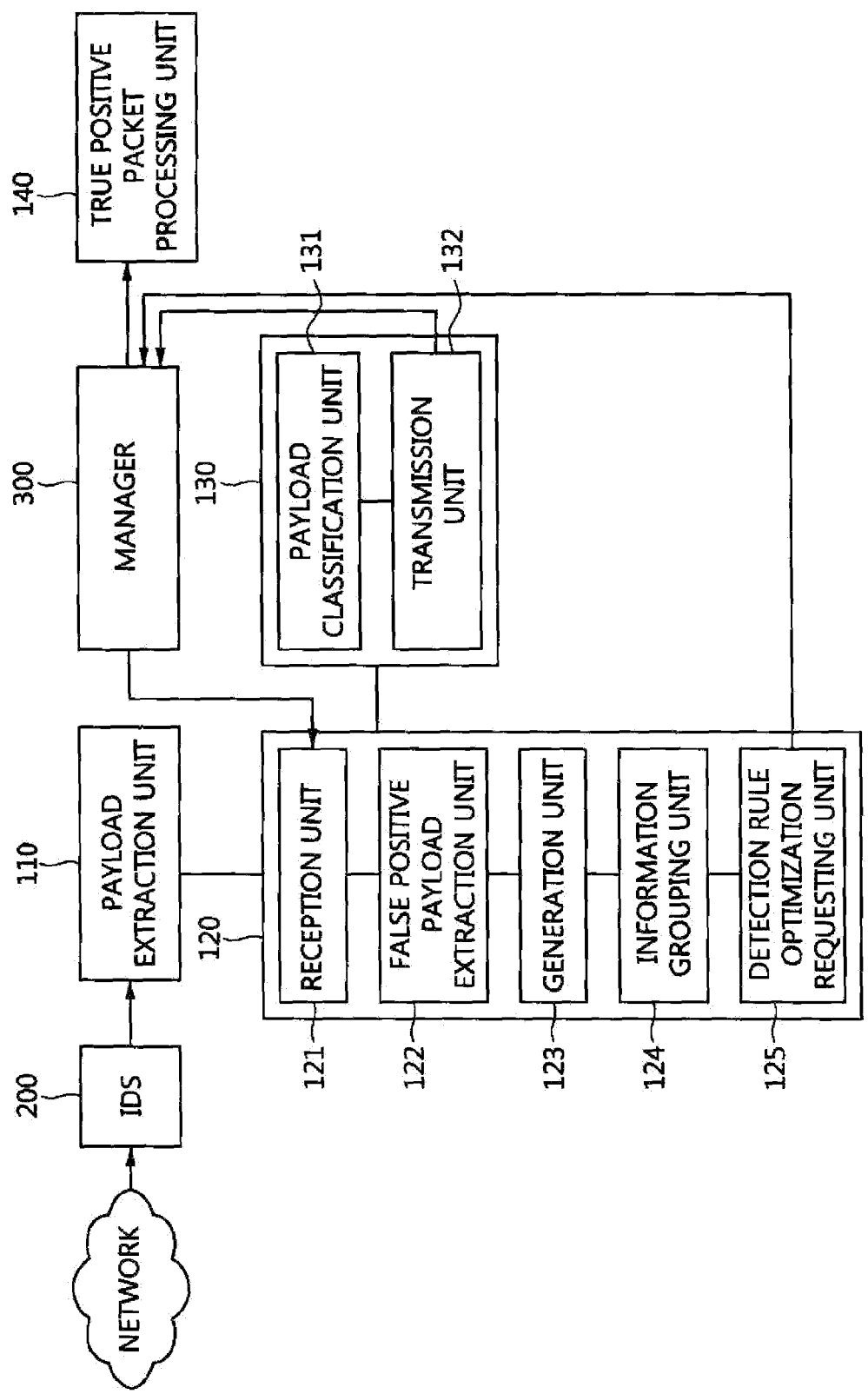
FIG. 2 is a diagram showing an embodiment of an IDS false positive detection apparatus according to the present invention.

FIG. 1 is a block diagram showing an IDS false positive detection apparatus according to the present invention. FIG. 2 is a diagram showing an embodiment of the IDS false positive detection apparatus according to the present invention.

Referring to FIGS. 1 and 2, an IDS false positive detection apparatus 100 according to the present invention includes a payload extraction unit 110, a false positive payload information generation unit 120, a false positive payload determination unit 130, and a true positive packet processing unit 140.

Further, the IDS false positive detection apparatus 100 according to the present invention is implemented based on packets detected by an Intrusion Detection System (IDS) 200 having unique detection rules, and is operated by transmitting or receiving data to or, from a manager 300 configured in another server or another device.

In detail, the IDS false positive detection apparatus 100 according to the present invention includes the payload extraction unit 110, the false positive payload information generation unit 120, and the false positive payload determination unit 130. The payload extraction unit 110 extracts payloads by dividing each packet corresponding to an IDS detection rule into a header and a payload. The false positive payload information generation unit 120 generates false positive payload information required to identify false positive payloads by extracting the payloads of false positive packets based on packet analysis results received from the manager. The false positive payload determination unit 130 transmits the results of determining, based on the false positive payload information, whether the payloads extracted by the payload extraction unit correspond to false positive payloads, to the manager.

Below, the individual components of the IDS false positive detection apparatus 100 according to the present invention will be described in detail.

The payload extraction unit 110 functions to extract payloads by dividing each packet corresponding to an IDS detection rule into a header and a payload.

Here, the term "IDS" denotes an intrusion detection system for performing the inspection of network packets, in which cyber threats may occur, in compliance with IDS detection rules via packet mirroring between an external network and an internal network.

Further, a packet is the basic unit of data transmission and is composed of a header which is located in the preceding part of the packet and includes an address and other types of control information, and a payload which includes actual user data.

The payload extraction unit 110 is configured to divide packets collected in compliance with IDS detection rules included in the IDS into headers and payloads. In this case, the present invention extracts and utilizes only payloads other than headers.

In this way, the reason for extracting only payloads other than headers is that Internal Protocol (IP) information and port information present in header information increase the complexity of false positive identification learning.

Further, the payload extraction unit 110 may divide packets into headers and payloads, and group payloads having the same data value among the divided payloads, thus inducing the results of determination, performed by the false positive payload determination unit 130 as to whether each grouped payload corresponds to a false positive payload, to be transmitted to the manager.

That is, upon determining whether a payload corresponds to a false positive payload, the same type of payloads may be simultaneously determined, thus reducing the complexity of the system and improving, the speed of acquisition of data related to the results of the determination of false positive payloads.

Below, the false positive payload determination unit 130 of the IDS false positive detection apparatus 100 according to the present invention will be described in detail. The reason for this is that, in order to describe the false positive payload information generation unit 120, it is easy to first describe the false positive payload determination unit 130.

The false positive payload determination unit 130 functions to transmit the results of determining whether each payload extracted by the payload extraction unit 110 corresponds to a false positive payload, based on the false positive payload information, to the manager 300.

The term "false positive payload information" denotes information that is a reference for distinguishing false positive and true positive of packets from each other based on payloads. A procedure for generating the false positive payload information will be described in detail later, together with the false positive payload information generation unit 120.

The false positive payload determination unit 130 includes a payload classification unit 131 and a transmission unit 132.

In detail, the payload classification unit 131 functions to classify payloads by comparing the false positive payload information with each payload extracted by the payload extraction unit, determining that the extracted payload is a false positive payload if the false positive payload information matches the extracted payload, and determining that the extracted payload is a suspected true positive payload if the false positive payload information does not match the extracted payload.

In greater detail, when a new packet is input to the apparatus, similarity between previously learned and generated false positive payload information and the payload of the new packet is determined by comparing them with each other. In this case, if the payload of the new packet matches the false positive payload information, the payload of the new packet is defined as a false positive payload.

In contrast, if the payload of the new packet does not match the false positive payload information, the payload of the new packet is defined as a true positive payload or a suspected true positive payload.

If a reference for distinguishing a true positive payload from a suspected true positive payload is designated as the degree of matching with the false positive payload information, a detailed reference value may be changed by a user or a manager.

The term "suspected true positive payload" denotes a payload suspected to be an actual true positive payload even if it is certain that the payload does not correspond to a false positive payload when it is compared to the false positive payload information.

Therefore, the suspected true positive payload is transmitted to the manager, thus allowing the manager to observe header information in detail and to analyze whether a packet, to which the suspected true positive payload belongs, includes a false positive payload.

In detail, the transmission unit 132 functions to transmit detection rules, the headers of packets, and false positive payloads and suspected true positive payloads classified by the payload classification unit, to the manager.

That is, the payload classification unit 131 classifies payloads into false positive payloads and suspected true positive payloads. The classified false positive payloads and suspected true positive payloads are transmitted to the manager by the transmission unit 132. Further, the headers of the false positive payloads and the suspected true positive payloads, and the IDS detection rules which are used as references for collecting the false positive payloads and the suspected true positive payloads, are also transmitted to the manager by the transmission unit 132.

Below, the false positive payload information generation unit 120 of the IDS false positive detection apparatus 100 according to the present invention will be described in detail.

Figure 3:
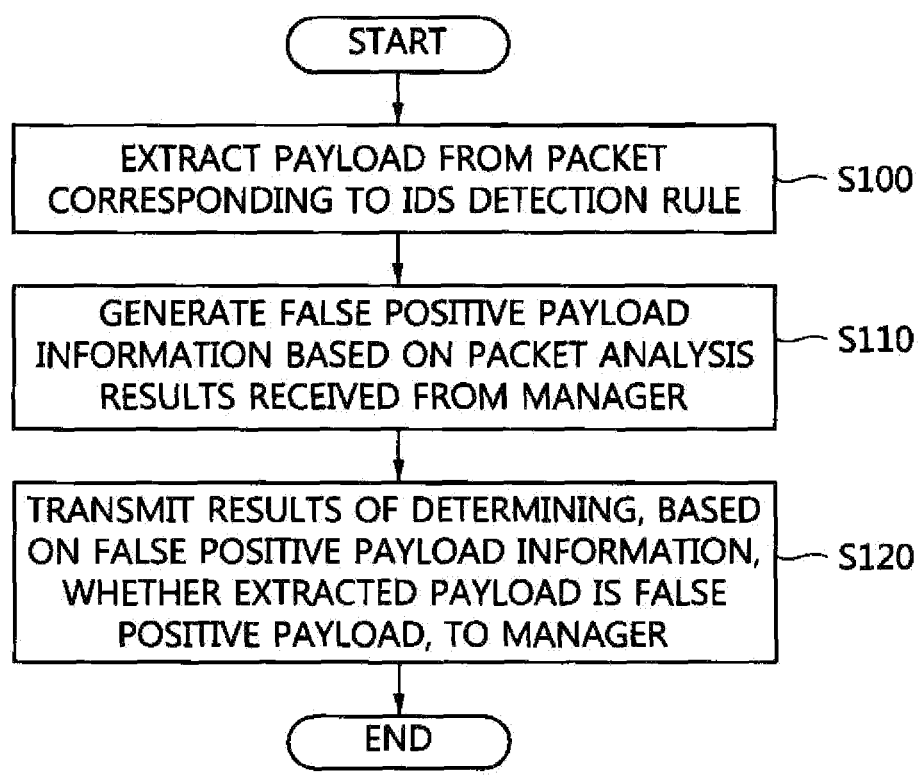
FIG. 3 is a flowchart showing an IDS false positive detection method according to the present invention.

Referring to FIG. 3, the false positive payload information generation unit 120 includes a reception unit 121, a false positive payload extraction unit 122, a generation unit 123, an information grouping unit 124, and a detection rule optimization requesting unit 125.

In detail, the reception unit 121 functions to receive a false positive packet from the manager 300 if a packet corresponding to a suspected true positive payload corresponds to a false positive packet including a false positive payload, based on the results of analysis performed by the manager 300 as to whether the packet includes a false positive payload.

The manager identifies true positives and false positives of packets by utilizing various types of information received from the transmission unit 132, that is, information about detection rules and the header information (IP information and port information) and the payload information (false positive payloads and suspected true positive payloads) of packet data.

In greater detail, since the suspected true positive payloads received from the transmission unit 132 may be false positive payloads, whether a packet corresponding to each suspected true positive payload corresponds to a false positive packet including a false positive payload, is analyzed by utilizing the header information and the detection rules. That is, the manager identifies a false positive or a true positive on a packet basis.

The false positive payload extraction unit 122 functions to extract a false positive payload included in each false positive packet received by the reception unit 121.

That is, since the manager analyzes a true positive or a false positive on a packet basis, the reception unit 121 receives a false positive packet other than a false positive payload. However, since the present invention is characterized in that false positive payload information is generated based on a payload, only a false positive payload included in the received false positive packet is extracted. The extraction of the payload is performed by the false positive payload extraction unit 122.

The generation unit 123 functions to convert all or part of each false positive payload extracted by the false positive payload extraction unit 122 into a Message Digest 5 Algorithm (MD5) value and generate false positive payload information.

Here, the term "false positive payload information" denotes information that is a reference for distinguishing false positives and true positives of collected packets based on payloads from each other, as described above.

The reason for converting all or part of the extracted false positive payload into an MD5 value is to more clearly and conveniently compare the redundancy and similarity of payloads. Further, even part of the false positive payload, as well as all of the false positive payload, is converted into an MD5 value, and thus a comparison can be more conveniently and efficiently performed, as contrasted with comparison target payloads.

For example, based on a 1,500 byte-payload (100%), payloads are extracted in terms of a 1,050-byte payload (70%), a 750-byte payload (50%), and a 450-byte payload (30%), and respective payloads are converted into MD5 values.

The information grouping unit 124 functions to group and classify pieces of false positive payload information, generated by the generation unit, for respective detection rules corresponding to the pieces of false positive payload information.

In detail, the information grouping unit 124 may separately group payloads depending on the size by which part of each payload is divided, group the payloads by detection rules, and store the false positive payload information in a false positive payload registration management database (DB).

In addition, even for payloads which are not grouped due to the non-presence of a portion identical to those of payloads classified by size, rates are measured in the descending order of similarity via the test of similarity to payloads using a data similarity measurement module, and the measured rates may be utilized as false positive payload information.

The detection rule optimization requesting unit 125 functions to identify detection rules on which false positives of or exceeding a preset rate have occurred, based on the false positive payload information grouped by the information grouping unit 124, and then provide an optimization request alarm for the identified detection rules to the manager.

In greater detail, information in which the number of occurrences of a false positive payload is accumulated for each detection rule is analyzed, based on the false positive payload information stored in the false positive payload registration management DB by the information grouping unit 124, and messages required to newly change or delete detection rules, in the descending order of the number of detections of a false positive payload, are sent to the manager.

That is, the reason for this is that the IDS may be more efficiently operated only if detection rules in which false positive payloads frequently occur are changed or deleted.

Here, in accordance with embodiments, the present invention may be designed to specify detection rules having or exceeding a threshold corresponding to the preset number of detections or a preset rate; as well as a detection rule having the largest number of detections of a false positive payload for each detection rule, and to provide information about the specified detection rules to the manager.

In this way, there is an advantage in that the manager that received an alarm message or an alarm signal from the detection rule optimization requesting unit 125, changes or deletes problem-causing detection rules.

The IDS false positive detection apparatus 100 according to the present invention may further include the true positive packet processing unit 140 configured to, if a packet corresponding to a suspected true positive payload corresponds to a true positive packet including no false positive payload, based on the results of analysis performed by the manager as to whether the packet includes a false positive payload, extract and store the time at which the true positive packet is detected, and a detection rule, IP information, port information, and payload information corresponding to the true positive packet.

In this case, the true positive packet processing unit 140 may store the detection rule, IP information, port information, and payload information corresponding to the true positive packet in an intrusion incident registration management DB.

Hereinafter, an IDS false positive detection method according to the present invention will be described in detail. As described above, repeated descriptions of components identical to those of the IDS false positive detection apparatus 100 according to the present invention will be omitted here.

FIG. 3 is a flowchart showing an IDS false positive detection method according to the present invention.

Referring to FIG. 3, the IDS false positive detection method according to the present invention includes steps S100 to S130. At step S100, the payload extraction unit extracts payloads by dividing each packet corresponding to an IDS detection rule into a header and a payload. At step S110, the false positive payload information generation unit generates false positive payload information required to identify false positive payloads by extracting the payloads of false positive packets based on packet analysis results received from a manager. At step S120, the false positive payload determination unit transmits the results of determining, based on the false positive payload information, whether the payloads extracted at the payload extraction step correspond to false positive payloads, to the manager.

Figure 4:
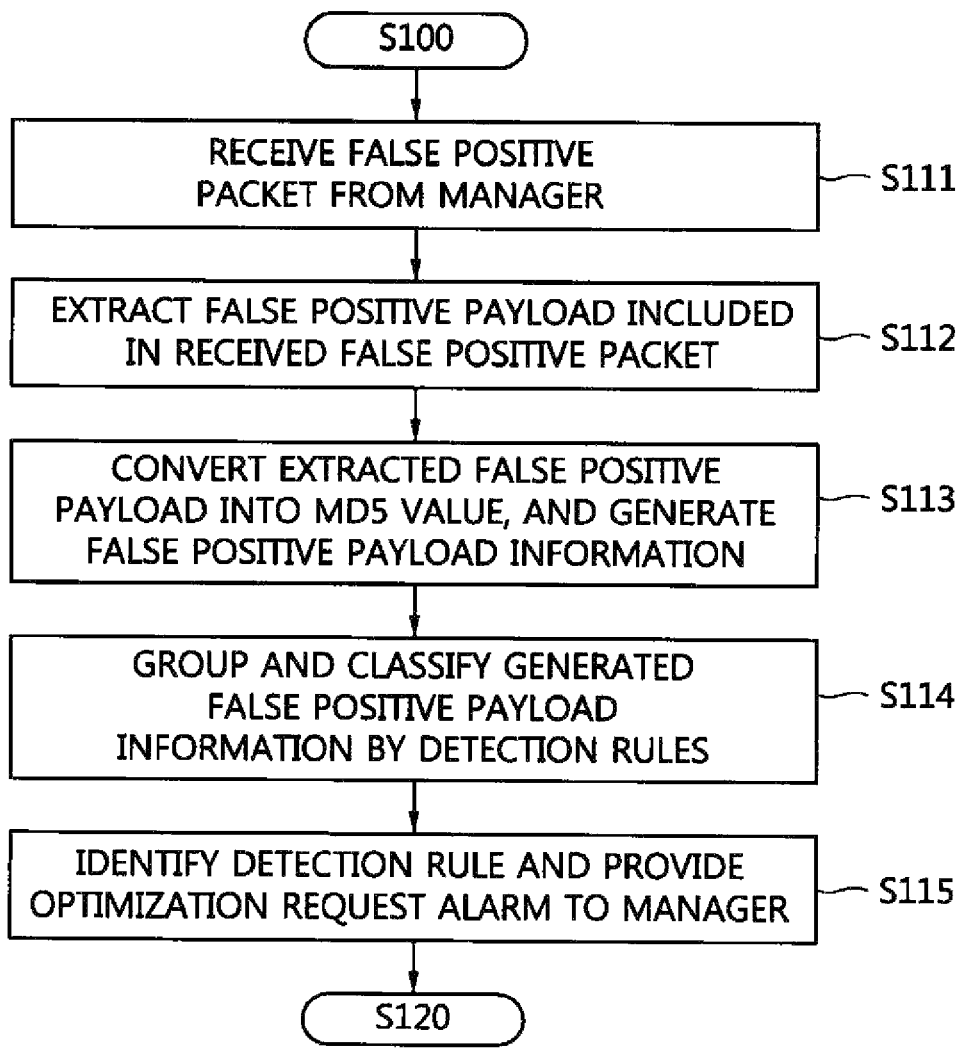
FIG. 4 is a diagram showing a false positive payload information generation step in the IDS false positive detection method according to the present invention.

FIG. 4 is a flowchart showing the false positive payload information generation step in the IDS false positive detection method according to the present invention.

In detail, referring to FIG. 4, step S110 includes steps S111 to S115. At step S111, based on the results of analysis performed by the manager as to whether a packet corresponding to a suspected true positive payload includes a false positive payload, if the packet corresponds to a false positive packet including a false positive payload, the false positive packet is received from the manager. At step S112, the false positive payload included in the false positive packet received at false positive packet reception step S111 is extracted. At step S113, false positive payload information is generated by converting all or part of the false positive payload, extracted at the false positive payload extraction step, into an MD5 value. At step S114, the false positive payload information generated at conversion and generation step S113 is grouped and classified by detection rules corresponding to the false positive payload information. At step S115, based on the false positive payload information grouped at the step of grouping and classifying the false positive payload information by detection rules corresponding to the false positive payload information, detection rules in which false positives of or exceeding a preset rate have occurred are identified, and thus an optimization request alarm for the identified detection rules is provided to the manager at step S115.

Figure 5:
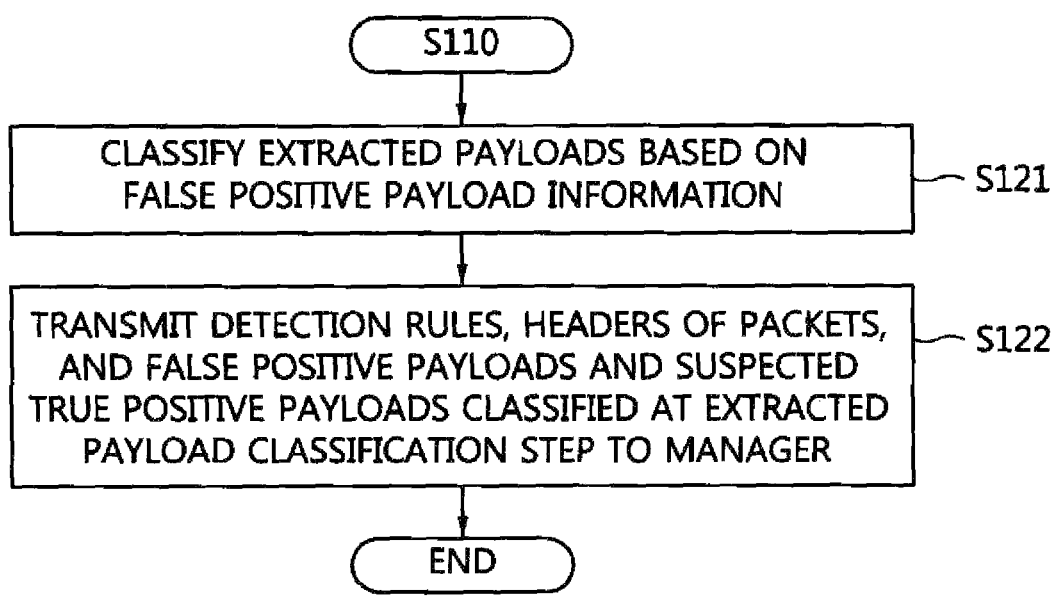
FIG. 5 is a diagram showing the step of transmitting determination results to a manager in the IDS false positive detection method according to the present invention.

FIG. 5 is a flowchart showing the step of transmitting determination results to the manger in the IDS false positive detection method according to the present invention.

In detail, referring to FIG. 5, step S120 includes steps S121 and S122. At step S121, the extracted payloads are classified by comparing the false positive payload information with each payload extracted by the payload extraction unit, determining that the extracted payload is a false positive payload when the false positive payload information matches the extracted payload, and determining that the extracted payload is a suspected true positive payload if the false positive payload information does not match the extracted payload. At step S122, the detection rules, the headers of the packets, and false positive payloads and suspected true positive payloads classified at extracted payload classification step are transmitted to the manger.

As described above, the IDS false positive detection apparatus 100 according to the present invention are advantageous in that there is provided a method of collecting corresponding rules and data about false positive payloads via a continuous learning procedure based on pure payloads other than the header parts of packets which are definitely determined to be false positives among a large number of packets detected by an IDS, so that, when a subsequent packet is input, the results of determining whether payloads are identical or similar to each other by automatically matching the learned results with the packet are provided, thus displaying only true positive packets or packets having a possibility of being true positives to an analyzer, with the result that the analyzer can minimize the time allocated to the analysis of false positives.

Further, the present invention is advantageous in that it can efficiently generate IDS detection rules by reporting the tasks of changing or deleting IDS detection rules in which false positives have occurred to a manager so that the tasks can be performed.

As described above, in the IDS false positive detection apparatus and method according to the present invention, the configurations and schemes in the above-described embodiments are not limitedly applied, and some or all of the above embodiments can be selectively combined and configured so that various modifications are possible.

What is claimed is:

1. An Intrusion Detection System (IDS) false positive detection apparatus, comprising:
   at least one hardware processor and a storage,
   a payload extractor which is executed by the at least one hardware processor and extracts each payload by dividing each packet corresponding to an IDS detection rule into a header and a payload;
   a false positive payload information generator which is executed by the at least one hardware processor and generates false positive payload information required to identify a false positive payload by extracting a payload of a false positive packet based on results of packet analysis received from a manager; and
   a false positive payload determinator which is executed by the at least one hardware processor and transmits results of a determination of whether the each payload extracted by the payload extractor corresponds to a false positive payload, based on the false positive payload information, to the manager, wherein the false positive payload determinator is configured to:

compare the false positive payload information with the each payload extracted by the payload extractor, if the false positive payload information matches the each extracted payload, determine that the each extracted payload is a false positive payload, and if the false positive payload information does not match the each extracted payload, determine that the each extracted payload is a suspected true positive payload, thus classifying the each extracted payload, and wherein the false positive payload determinator comprises a transmission unit for transmitting the detection rule, the header of the packet, and the false positive payload and the suspected true positive payload classified by a payload classifier to the manager.

2. The IDS false positive detection apparatus of claim 1, wherein the payload extractor divides each packet into a header and a payload and groups each payload having an identical data value, thus inducing results of determination, performed by the false positive payload determinator as to whether the each grouped payload corresponds to a false positive payload, to be transmitted to the manager.

3. The IDS false positive detection apparatus of claim 1, wherein the false positive payload information generator comprises a reception unit for, if a packet corresponding to the suspected true positive payload corresponds to a false positive packet including a false positive payload, based on results of analysis performed by the manager as to whether the packet includes a false positive payload, receiving the false positive packet from the manger.

4. The IDS false positive detection apparatus of claim 3, wherein the false positive payload information generator further comprises a false positive payload extraction unit for extracting a false positive payload included in the false positive packet received by the reception unit.

5. The IDS false positive detection apparatus of claim 4, wherein the false positive payload information generator further comprises a generation unit for converting all, or part of the false positive payload extracted by the false positive payload extraction unit into a Message Digest Algorithm 5 (MD5) value, and then generating false positive payload information.

6. The IDS false positive detection apparatus of claim 5, wherein the false positive payload information generator further comprises an information grouping unit for grouping and classifying the false positive payload information, generated by the generation unit, by detection rules corresponding to the false positive payload information.

7. The IDS false positive detection apparatus of claim 6, wherein the false positive payload information generator further comprises a detection rule optimization requesting unit for identifying a detection rule in which false positives of or exceeding a preset rate have occurred, based on the false positive payload information grouped by the information grouping unit, thus providing an optimization request alarm for the identified detection rule to the manager.

8. The IDS false positive detection apparatus of claim 1, further comprising a true positive packet processor for, if a packet corresponding to the suspected true positive payload corresponds to a true positive packet having no false positive payload, based on results of analysis performed by the manager as to whether the packet includes a false positive payload, extracting and storing a time at which the true positive packet is detected, and a detection rule, Internet Protocol (IP) information, port information, and payload information corresponding to the true positive packet.

9. An Intrusion Detection System (IDS) false positive detection method, comprising:

extracting, by a payload extractor, each payload by dividing each packet corresponding to an IDS detection rule into a header and a payload;

generating, by a false positive payload information generator, false positive payload information required to identify a false positive payload by extracting a payload of a false positive packet based on results of packet analysis received from a manager; and transmitting, by a false positive payload determinator, results of determination of whether each of the extracted payloads corresponds to a false positive payload, based on the false positive payload information, to the manager, wherein transmitting the results of determination to the manager comprises:

comparing the false positive payload information with the each payload extracted by the payload extractor;

if the false positive payload information matches the each extracted payload, determining that the each extracted payload is a false positive payload; and if the false positive payload information does not match the each extracted payload, determining that the each extracted payload is a suspected true positive payload, thus classifying the each extracted payload, and wherein transmitting the results of the determination to the manager further comprises, after classifying the each extracted payload, transmitting the detection rule, the header of the packet, and the classified false positive payload and suspected true positive payload to the manager.

10. The IDS false positive detection method of claim 9, wherein extracting the each payload comprises dividing each packet into a header and a payload, and grouping each payload having an identical data value, thus inducing results of determination of whether the each grouped payload corresponds to a false positive payload to be transmitted to the manager.

11. The IDS false positive detection method of claim 9, wherein generating the false positive payload information comprises, if a packet corresponding to the suspected true positive payload corresponds to a false positive packet including a false positive payload, based on results of analysis performed by the manager as to whether the packet includes a false positive payload, receiving the false positive packet from the manger.

12. The IDS false positive detection method of claim 11, wherein generating the false positive payload information further comprises, after receiving the false positive packet from the manager, extracting a false positive payload included in the received false positive packet.

13. The IDS false positive detection method of claim 12, wherein generating the false positive payload information further comprises, after extracting the false positive payload, converting all or part of the extracted false positive payload into a Message Digest Algorithm 5 (MD5) value, and then generating false positive payload information.

14. The IDS false positive detection method of claim 13, wherein generating the false positive payload information further comprises grouping and classifying the generated false positive payload information by detection rules corresponding to the false positive payload information.

15. The IDS false positive detection method of claim 14, wherein generating the false positive payload information further comprises, after grouping and classifying the false positive payload information:
    identifying a detection rule in which false positives of or exceeding a preset rate have occurred, based on the grouped false positive payload information, thus providing an optimization request alarm for the identified detection rule to the manager.

16. The IDS false positive detection method of claim 9, further comprising, after transmitting the results of the determination, if a packet corresponding to the suspected true positive payload corresponds to a true positive packet having no false positive payload, based on results of analysis performed by the manager as to whether the packet includes a false positive payload:
    extracting and storing, by a true positive packet processor, a time at which the true positive packet is detected, and a detection rule, Internet Protocol (IP) information, port information, and payload information corresponding to the true positive packet.

\* \* \* \* \*